United States Patent [19]

Torres

[11] Patent Number: 4,622,233
[45] Date of Patent: Nov. 11, 1986

[54] PREPARATION AND USE OF A HIGHLY PURIFIED POLYDEXTROSE

[75] Inventor: Anibal Torres, Waterford, Conn.

[73] Assignee: Pfizer Inc., New York, N.Y.

[21] Appl. No.: 678,610

[22] Filed: Dec. 6, 1984

[51] Int. Cl.⁴ .............................................. A23L 1/09
[52] U.S. Cl. .................................. 426/548; 426/804; 426/660; 426/549; 426/579; 426/564; 426/567; 426/590; 426/576; 426/3; 426/570; 426/589; 426/605; 426/591
[58] Field of Search ............... 426/539, 548, 804, 442, 426/258

[56] References Cited

U.S. PATENT DOCUMENTS

| | | | |
|---|---|---|---|
| 2,379,335 | 6/1945 | Baker | 426/539 |
| 2,433,611 | 12/1947 | Ingels | 426/539 |
| 2,876,104 | 3/1959 | Bliudzius et al. | 426/548 |
| 2,876,105 | 3/1959 | Jucaitis et al. | 426/548 |
| 2,876,106 | 3/1959 | Jucaitis et al. | 426/548 |
| 2,876,107 | 3/1959 | Jucaitis et al. | 426/548 |
| 3,047,406 | 7/1962 | Ferrari et al. | 426/539 |
| 3,766,165 | 10/1973 | Rennhard | 260/209 R |
| 3,876,794 | 4/1975 | Rennhard | 426/152 |

OTHER PUBLICATIONS

Rose, A. et al., 1966, The Condensed Chemical Dictionary, Reinhold Publishing Corp., NY, pp. 110 and 180.

Primary Examiner—Raymond N. Jones
Assistant Examiner—Carolyn Paden
Attorney, Agent, or Firm—Charles J. Knuth; Albert E. Frost; James M. McManus

[57] ABSTRACT

Methods for preparing purified, decolorized polydextrose having a lower caloric value, higher pH and less color than presently available commercial material, and the use of said improved product in edible foodstuffs and beverages.

5 Claims, No Drawings

PREPARATION AND USE OF A HIGHLY PURIFIED POLYDEXTROSE

BACKGROUND OF THE INVENTION

This invention relates to methods for preparing purified, decolorized polydextrose and the use of this material in making edible foodstuffs.

U.S. Pat. No. 3,766,165 describes the preparation of a polydextrose through the polymerization of glucose in the presence of food-acceptable polycarboxylic acid catalysts and polyols. This polydextrose is a non-nutritive carbohydrate substitute having wide application in the preparation of edible foodstuffs, as claimed in U.S. Pat. No. 3,876,794.

While the polydextrose of U.S. Pat. No. 3,766,165 is low in caloric content, the presence of low molecular weight components, such as glucose, sorbitol and oligomers, gives it a caloric value of about one calorie per gram. In instances where large amounts of polydextrose would be ingested it would be desirable to lower the caloric value even further.

In addition, the use of food-acceptable polycarboxylic acids as catalysts in the polymerization process in preparing polydextrose leads to pH's of about 2.5 when the polydextrose is dissolved in an aqueous media. The acid nature of such polydextrose precludes its use in many products which normally have a pH range of 5–8.

In addition to the presence of low molecular weight caloric materials and low pH of polydextrose prepared in U.S. Pat. No. 3,766,165, the product has a yellow color and possesses a slight bitter taste due to the presence of anhydroglucose. These drawbacks especially limit the use of polydextrose in products which are normally white in color and have no bitter taste.

SUMMARY OF THE INVENTION

It has now been found that two very simple operations can be employed to provide purified, decolorized polydextrose, thereby extending its' use to products requiring lower caloric polydextrose and a polydextrose which has a pH closer to neutrality, is free of the bitter taste of anhydroglucose and gives a water white solution on dissolution.

The first method for preparing purified, decolorized polydextrose consists of contacting a food approved bleaching agent with a slurry consisting of 5 to 60% (W/W) of polydextrose A, the polydextrose prepared in U.S. Pat. No. 3,766,165, in methanol, ethanol or isopropanol followed by filtration and drying of the final product.

Preferred in this method is the use of a food approved bleaching agent selected from hydrogen peroxide, benzoyl peroxide and sodium chlorite and the use of methanol, ethanol or isopropanol.

Also part of the present invention is an edible foodstuff or beverage containing purified, decolorized polydextrose, prepared by the aforementioned first method. Edible foodstuffs and beverages especially contemplated include baked goods, tabletop sweeteners, candies, frostings and confections, desserts, chewing gum, salad dressings, preserves, syrups, gelatin desserts, puddings, whipped toppings, pies, carbonated beverages, dry beverage mixes, chocolate bars, coffee whiteners and sweet sauces.

The second method for preparing purified, decolorized polydextrose comprises the steps of (1) contacting a 60–70% (W/W) aqueous solution of polydextrose A, the polydextrose prepared in U.S. Pat. No. 3,766,165, with a food approved bleaching agent at a temperature for 25°–90° C. and a pH of about 2.5 to about 9; (2) adjusting the pH of the product of step (1), if above 7, to about 6; (3) adding one or more of the solvents from the group consisting of methanol, ethanol, and ethyl acetate such that said solvent or solvents comprises 50–85% (W/W) of the mixture; (4) filtering of the final product, and if desired drying.

Preferred in this second method is the use of a food approved bleaching agent selected from hydrogen peroxide, benzoyl peroxide and sodium chlorite, a pH of about 9, and adjustment of the pH to about 6 with a 20% (W/W) aqueous citric acid solution. It is especially preferred that the food approved bleaching agent in this second method be hydrogen peroxide.

A feature of the present invention is an edible food stuff or beverage containing purified, decolorized polydextrose prepared by the aforementioned second method. Edible foodstuffs and beverages contemplated include baked goods, table top sweeteners, candies, frostings and confections, desserts, chewing gum, salad dressings, preserves, syrups, gelatin desserts, puddings, whipped toppings, pies, carbonated beverages, dry beverage mixes, chocolate bars, coffee whiteners and sweet sauces.

Especially contemplated is a table top sweetener comprised of purified, decolorized polydextrose and an artificial sweetener in a ratio to the isosweetness of sucrose, wherein the artificial sweetener is one or more from the group consisting of L-aspartyl-L-phenylalanine methyl ester, 3-(L-aspartyl-D-alanamido)-2,2,4,4-tetramethylthietane, saccharin and base salts thereof, potassium 6-methyl-1,2,3-oxathiazin-4(3H)-one-2,2-dioxide and cyclamate and base salts thereof.

A further feature of the present invention is a method for preparing a tabletop sweetener which comprises the steps of (1) blending 70–93% (W/W) water wet cake of polydextrose, purified and decolorized by the aforementioned second method, with a 0.05–5% (W/W) aqueous suspension or solution of an artificial sweetener in a ratio corresponding to the isosweetness of sucrose; (2) heating the homogeneous solution or syrup to dryness at 50°–90° C. under vacuum; and (3) milling the resulting solid to a size of about 420–840 microns.

A preferred feature of this method is the use of one or more artificial sweeteners selected from the group L-aspartyl-L-phenylalanine methyl ester, 3-(L-aspartyl-D-alanamido)-2,2,4,4-tetramethylthietane, saccharin and base salts thereof, potassium 6-methyl-1,2,3-oxathiazin-4(3H)-one-2,2-dioxide and cyclamate and base salts thereof.

A further aspect of the present invention is a dietetic food composition comprising a fatty-triglyceride-containing food wherein at least part of said triglyceride ordinarily contained therein is replaced by purified, decolorized polydextrose prepared according to either the first or second aforemention purification, decolorization methods.

A still further aspect of the present invention is a dietetic food composition comprising a fatty-triglyceride and carbohydrate-containing food wherein at least part of said triglyceride and carbohydrate are replaced by polydextrose prepared according to either the first or second aforementioned purification, decolorization methods.

DETAILED DESCRIPTION OF THE INVENTION

The first method for preparing purified, decolorized polydextrose consists of combining a food approved bleaching agent, an alkanol and polydextrose A, and allowing the resulting slurry to stir at room temperature for from 5–24 hours. The slurry is subsequently filtered and dried.

The bleaching agent employed in this method can vary considerably in nature. Hydrogen peroxide, benzoyl peroxide and sodium chlorite, however, are the preferred agents.

The alkanols useful in this method are those which will solubilize the low molecular weight impurities present in the starting polydextrose A, will not dissolve the polymer polydextrose and are not incompatible with a food stuff should trace amounts be left in the final product. The alkanols which meet these requirements include methanol, ethanol and isopropanol.

As previously indicated, the polydextrose used as the starting material for this method is prepared according to the procedures of U.S. Pat. No. 3,766,165. Polydextose A is reported in said U.S. patent as the soluble form of polydextrose and is prepared by using 1% citric acid catalyst, 10% sorbitol and 89% dextrose.

In making up the slurry of polydextrose A in the requisite alkanol it is preferred that said polydextrose consist of 5–60% (W/W) of the slurry.

The contact time necessary to decolorize the polydextrose and remove low molecular weight impurities, can vary considerably; a time 5–24 hours is usually preferred.

The amount of bleaching agent to be used will depend on the degree of decoloration of the polydextrose desired and how rapidly such decoloration is to be effected. In general, from about 0.1% to about 10% (W/W) of the bleaching agent (based on polydextrose) is sufficient to carry out the decoloration in the contact time previously indicated.

On completion of the decolorization procedure the product is filtered, washed with a fresh portion of the alkanol used and dried. The drying is most conveniently carried out at 50°–70° C. under vacuum. The product can be further milled if desired.

As previously indicated, this method is an extremely simple one step procedure for decolorizing and purifying of polydextrose whereby reducing its caloric content, the bitter taste of anhydroglucose and providing a whiter material. While U.S. Pat. No. 3,766,165 suggests using bleaching agents to remove undesired color from polydextrose, it fails to describe a method such as the present invention wherein the polydextrose can be decolorized and purified in a simple one step operation, and which provides the final product in granular form.

The second method for decolorizing and purifying polydextrose prepared by the procedures of U.S. Pat. No. 3,766,165 allows for the neutralization of linked polyacid catalysts such that an aqueous solution of the resulting decolorized, purified polydextrose will have the desired pH depending on the degree of neutralization. Further, this simple method provides decolorized, purified polydextrose in a granular form.

The second method for preparing purified, decolorized polydextrose comprises the steps of (1) contacting a 60–70% (W/W) aqueous solution of polydextrose A with a bleaching agent at a temperature of 25°–90° C. and a pH of about 2.5 to about 9; (2) adjusting the pH of the product of step (1), if above 7, to about 6; (3) adding an appropriate solvent or solvents such that said solvent or solvents comprise 50–85% (W/W) of the mixture; (4) filtering of the final product, and drying, if desired.

The bleaching agent with which the aqueous solution of polydextrose A is combined can vary considerably. It is preferred that a food approved bleaching agent, such as hydrogen peroxide, benzoyl peroxide or sodium chlorite, be employed. Hydrogen peroxide is the food approved bleaching agent of choice in this method. The amount of bleach employed depends on the degree of decolorization required and how rapidly the process is to be effected. In general, from about 0.1% to about 10% (W/W) of the bleaching agent (base or polydextrose) is employed.

The bleaching time can vary depending on the amount of bleach added as well as the temperature. When the method is conducted at ambient temperatures a period of 24 hours is usually sufficient. When higher temperatures are employed the time required can be reduced to 2–3 hours. The temperature range can vary between 25° C. to about 90° C.

As previously mentioned, this method allows for a neutralization of polyacids linked to the polydextrose such that when the polydextrose product is dissolved in an aqueous media, the pH will vary depending on the degree of neutralization taken place. The pH of polydextrose as prepared by U.S. Pat. No. 3,766,165 when dissolved in water is about 2.5. By adding base to the solution of polydextrose and bleaching agent one can obtain a product which, when dissolved in an aqueous medium, gives a pH corresponding to that obtained by the base addition. As a result it is possible, by controlling the amount of base, to obtain a product having a pH in solution of 2.5 to 7.

In addition, it has been found that the bleaching process appears to proceed faster if the pH is above 7.0. Consequently, the present method allows for the pH to be adjusted up to 9 during the bleaching period and then to be lowered by the addition of an appropriate acid to below 7 and preferably to about 6.

When raising the pH of the aqueous solution of polydextrose and bleaching agent it is preferred, for dietetic reasons, that bases containing the potassium cation be employed. Such bases would include potassium hydroxide, potassium carbonate and potassium bicarbonate. When the pH of the solution is above 7 and is to be lowered prior to the addition of one or more solvents, it is preferred that a food approved carboxylic acid be employed, such as citric acid, tartaric acid, fumaric acid, etc.

The addition of certain solvents or mixtures thereof to the aqueous solution of polydextrose and bleaching agent results in precipitation of purified, decolorized polydextrose. This addition can be made after the bleaching period is over or during the bleaching period. When the pH of the solution has been raised to above 7 to facilitate bleaching, it is preferred that the solvent be added after the pH has been adjusted to below 7. Those solvents which can be added may consist of one or more of methanol, ethanol or ethyl acetate. The addition of these solvents results in a precipitated polydextrose containing less caloric components, less anhydroglucose and less oligomers. The amount of solvent or solvents added should lead to a mixture wherein said solvent or solvents accounts for 50–85% (W/W) of the total mixture.

Following the completion of the procedure, the product is filtered and, if desired, can be dried. When drying is required it can be carried out usually under vacuum at slightly elevated temperatures.

While this second method for preparing purified, decolorized polydextrose allows for the isolation of the product in granular form, it is possible that certain uses may require further milling of the product.

A further aspect of the present invention is a method for preparing a tabletop sweetener which comprises combining a water wet cake of purified, decolorized polydextrose, i.e. polydextrose purified by the aforementioned second method, with an aqueous suspension or solution of an artificial sweetener.

The water wet purified, decolorized polydextrose should comprise from 70 to 93% by weight of the cake. Further the polydextrose used should be that prepared by the second method for preparing purified, decolorized polydextrose wherein the pH of the polydextrose, when dissolved in water, is about 6.

The wet cake and an aqueous suspension or solution of the artificial sweetener should be thoroughly blended. Depending on the water solubility of the artificial sweetener it may be required that said sweetener be suspended in water as opposed to a more water soluble sweetener which may result in a solution. It is preferred that the amount of sweetener in the suspension or solution amount to 0.05–5% on a weight basis.

The actual amount of artificial sweetener added to the purified, decolorized polydextrose to provide an isosweetness to sucrose will vary depending on the sweetness strength of said artificial sweetener. One skill in the art of artificial sweeteners is aware how much of an artificial sweetener is equivalent to a corresponding sweetening amount of sucrose. The artificial sweeteners contemplated for combination with purified, decolorized polydextrose include L-aspartyl-L-phenylalanine methyl ester, 3-(L-aspartyl-D-alanamido)-2,2,4,4-tetramethylthietane (U.S. Pat. No. 4,411,925), saccharin and base salts thereof, potassium 6-methyl-1,2,3-oxathiazin-4(3H)-one-2,2-dioxide (U.S. Pat. No. 3,689,486) and cyclamate and base salts thereof.

Following the blending of the artificial sweetener with purified, decolorized polydextrose, the mixture is heated from 50°–90° C. under vacuum to remove as much water as possible without decomposition of the materials. The mass remaining, which is composed of an intimate mixture of the artificial sweetener and polydextrose, is then milled to 420–840 microns, the particule size of household sucrose.

A tabletop sweetener prepared by this method is not susceptible to the physical separation of a mechanically mixed artifical sweetener and bulking agent. Each grain or particle of this tabletop contains the same approximate ratio of polydextrose and artificial sweetener. In addition, the particle size is relatively homogeneous and visually resembles that of household sucrose.

As previously indicated, the purified, decolorized polydextrose prepared by the described methods enjoys a wider application over polydextrose A for imparting the physical properties of natural foods, other than sweetness, to dietetic foods from which the natural sugars have been removed and replaced by artificial or other sweeteners, especially when a less bitter, whiter and more neutral bulking agent is desired.

Typical products in which the purified, decolorized polydextrose prepared by the methods of the present invention finds use include low calorie jellies, jams, preserves, marmalades and fruit butters; in dietetic frozen food compositions, including ice cream, iced milk, sherbet and water ices; in baked goods such as cakes, cookies, pastries and other foodstuff containing wheat or other flour; in icings, candy and chewing gum; in beverages such as non-alcoholic soft drinks and root extracts; in syrups; in toppings, sauces and puddings; in salad dressings and as bulking aqents for dry low calorie sweetener compositions containing an artificial sweetener. In fact, all the uses indicated for polydextrose A in U.S. Pat. No. 3,876,794 would be expanded by a purified, decolorized polydextrose which is of a slightly lower calorie content, less bitter, whiter and available at any pH from 3 to about 6.

The following examples are included to provide guidance on the incorporation of purified, decolorized polydextrose into various dietetic food compositions and edible foodstuffs and beverages.

EXAMPLE 1—(METHOD 1)

A 22 liter flask equipped with stirrer and condenser was charged with 12,000 grams of methyl alcohol (89.8%), 210 grams of 30% hydrogen peroxide solution (8% based on polydextrose weight) and 1,500 grams of polydextrose Type A (11.1%). The mixture was stirred at room temperature for 24 hours. The solids were filtered off onto a 32 cm funnel covered with filter cloth, washed with 3,000 grams of methanol and dried in trays at 70° C. in a vacuum oven equipped with a vacuum pump for 2 hours. The resulting fluffy mass was broken up, dried overnight (18 hours) in the same oven and subsequently milled to a granular powder. The yield was 1,058.6 grams (70.6%). The following table compares the composition (by GPC) of the resultant product relative to the food grade polydextrose used as the starting material for the purified grade polydextrose.

| Polydextrose Peak | Identity | Starting Material % | Purified Material % |
| --- | --- | --- | --- |
| P | Polymer | 64.4 | 80.9 |
| 5 | Pentasaccharides | 8.9 | 6.6 |
| 4 | Tetrasaccharides | 9.0 | 5.6 |
| 3 | Trisaccharides | 8.5 | 4.0 |
| 2 | Disacch. & Sorbitol | 3.3 | 1.7 |
| 1 | Glucose | 3.2 | 0.8 |
| A | Anhydroglucose | 2.3 | 0.4 |

EXAMPLE 2

Using the same procedure as Example I an intimate mixture of 201.1 grams methanol, 25 grams polydextrose Type A and 0.14 grams benzoyl peroxide were stirred in a 500 ml-three necked flask. This produced a purified polydextrose closely resembling that obtained in Example I.

EXAMPLE 3

The process of Example II, differing only in the substitution of 0.25 grams of sodium chlorite for 0.14 grams of benzoyl peroxide, yielded a purified polydextrose identical in composition and physical properties of that of Example II.

EXAMPLE 4—(METHOD 1)

A 22 liter flask equipped with a stirrer and under positive $N_2$ pressure was charged with 10,800 grams of methyl alcohol (80%) and 5.4 grams of sodium chlorite (0.2% based on polydextrose) and 2,700 grams (20%) of milled polydextrose Type A. The mixture was stirred at room temperature for 5 hours. The solids were filtered off (in a Buchner funnel covered with filter cloth), washed with 3,000 grams of methanol and dried in trays at 70° C. in a vacuum oven (house vacuum) for 2 hours. The resulting fluffy mass was broken up, dried overnight (18 hours) in the same oven and subsequently milled to a granular powder. The yield was 2198.0 grams (81.4%).

Data for the product is as follows:

| | |
|---|---|
| Polymer | 76.1% |
| Pentasaccharides | 7.6% |
| Tetrasaccharides | 7.5% |
| Trisaccharides | 5.8% |
| Disaccharides + Sorbitol | 1.4% |
| Glucose | 1.0% |
| Levoglucosan | 0.6% |
| Color 20% aqueous solution | water white |
| pH 20% aqueous solution | 3.0% |

EXAMPLE 5—(METHOD 1)

In a 500 ml, three-necked flask equipped with stirrer and calcium sulfate drying tube and intimate mixture of 201.2 grams of ethyl alcohol, 25 grams polydextrose Type A and 0.07 grams of benzoyl peroxide was stirred at room temperature for 24 hours. The liquid layer was vacuum filtered off and the solids washed with 50 ml of ethanol. The white solids were dried at 70° C. in a vacuum oven at 63.5 cm of Hg for one hour. The resulting fluffy mass was broken up, dried for an additional hour and milled to a fine powder. Data for the product was as follows:

| Assays by GPC | Concentration % |
|---|---|
| Polymer | 68.0 |
| Pentasaccharides | 8.6 |
| Tetrasaccharides | 8.8 |
| Trisaccharides | 8.7 |
| Disaccharides + Sorbitol | 2.2 |
| Glucose | 2.1 |
| Anhydroglucose | 1.6 |
| pH 70% aqueous solution | 2.8 |
| Color 70% aqueous solution | straw-colored, clear solution |

EXAMPLE 6

The process of Example 5, differing only in the substitution of 2 grams of 30% solution of hydrogen peroxide for 0.07 grams of benzoyl peroxide. A purified polydextrose was produced which was similar in composition to that of Example 5.

EXAMPLE 7

The process of Example 5 differing only in the substitution of 0.25 grams of sodium chlorite for 0.07 grams of benzoyl peroxide resulted in a product with similar composition and appearance as that of Example 5.

EXAMPLE 8—(METHOD 1)

A charge of 201.2 grams of isopropyl alcohol, 25 grams of polydextrose Type A and 2 grams of 30% solution of hydrogen peroxide were mixed thoroughly in a 500 ml three-necked flask for 24 hours at room temperature (25° C.). The solids were filtered off, washed with 50 ml isopropyl alcohol and dried at 70° C. in a vacuum oven at 63.5 cm of Hg for one hour. Subsequently the mass was broken up, dried for an additional hour and milled to a fine powder. The following data on the product was obtained:

| | |
|---|---|
| Yield % | 78.8% |
| pH 70% aqueous solution | 2.70 |
| Color of 70% aqueous solution | straw-color, clear solution |

| Composition by GPC | Concentration % |
|---|---|
| Polymer | 67.0 |
| Pentasaccharides | 8.8 |
| Tetrasaccharides | 9.2 |
| Trisaccharides | 8.7 |
| Disaccharides + Sorbitol | 2.3 |
| Glucose | 2.3 |
| Anhydroglucose | 1.7 |

EXAMPLE 9

The process of Example 8, differing only in the substitution of 0.14 grams of benzoyl peroxide for 2 grams of 30% solution of hydrogen peroxide, produced a purified polydextrose closely resembling that obtained in Example 8.

EXAMPLE 10

The process of Example 8, differing only in the substitution of 0.75 grams sodium chlorite for 2 grams of 30% solution of hydrogen peroxide produces a product closely resembling the compostion that obtained in Example 8.

EXAMPLE 11—(METHOD 1)

In a 500 ml, three-necked flask equipped with stirrer, and calcium sulfate drying tube the following ingredients were mixed as outlined below.

201.2 grams methanol
35.1 grams 70% aqueous solution polydextrose Type A (24.6 g solids)
0.25 grams sodium chlorite The methanol was stirred and the sodium chlorite added. The 70% solution of polydextrose was then added beneath the surface of the methanol slowly (~5 minutes) via a 50 cc syringe catheter. The mixture was stirred at ambient temperature (~25° C.) for 24 hours. The solids were filtered off, washed with 50 ml methanol and dried at 70° C. in a vacuum oven at 63.5 cm of Hg for one hour. The resulting fluffy mass was broken up, dried for an additional hour and milled to a fine powder. The following data on the white-sugar like powder was obtained.

| | |
|---|---|
| Yield % | 78.5 |
| pH of 10% water solution | 3.31 |
| Color of 10% water solution | water white |

| Composition | Concentration % |
|---|---|
| Polymer | 73.4 |
| Pentasaccharides | 7.8 |
| Tetrasaccharides | 7.6 |
| Trisaccharides | 6.4 |
| Disaccharides + Sorbitol | 1.9 |
| Glucose | 2.0 |
| Anhydroglucose | 1.0 |

EXAMPLE 12

Same process of Example 11 differing only in the substitution of 2 grams of 30% solution of $H_2O_2$ for 0.25 grams of sodium chlorite and that the 70% polydextrose solution pH was adjusted to pH 5.33 with KOH. This gave a product similar in composition and appearance as that obtained in Example 11, differing only in pH.

EXAMPLE 13

Identical to Example 12 except the 70% polydextrose solution was adjusted to pH 7.03 and substitution of 0.07 grams benzoyl peroxide for 2 grams of 30% hydrogen peroxide solution. The resulting purified polydextrose shows a similar composition and color as that obtained in Example 12, differing only in pH.

EXAMPLE 14—(METHOD 1)

An intimate mixture of 201.2 grams ethanol, 35.4 grams of a 70% polydextrose Type A solution and 0.07 grams benzoyl peroxide was placed in a 500 ml flask according to the procedure outlined in Example 11. Data on the resulting products is as follows:

| | |
|---|---|
| Yield % | 97.8 |
| pH of 70% aqueous solution | 2.82 |
| Color of 70% aqueous solution | straw-color, clear solution |
| Composition by GPC | Concentration % |
| Polymer | 66.9 |
| Pentasaccharides | 8.7 |
| Tetrasaccharides | 9.0 |
| Trisaccharides | 9.6 |
| Disaccharides + Sorbitol | 2.0 |
| Glucose | 2.2 |
| Anhydroglucose | 1.3 |

EXAMPLE 15

The process of Example 14, wherein the pH of the 70% polydextrose Type A solution is raised to 5.33 and substitution of 0.25 grams of sodium chlorite for 0.07 grams of benzoyl peroxide produces a purified polydextrose closely resembling that obtained in Example 14.

EXAMPLE 16

The process of Example 14, wherein the 70% polydextrose Type A solution pH is raised to 7.03 and substitution of 2 grams of 30% solution of hydrogen peroxide for 0.07 grams of benzoyl peroxide produces a purified polydextrose closely resembling that obtained in Example 14.

EXAMPLE 17—(METHOD 1)

In a 500 ml, three-necked flask equipped with stirrer and calcium sulfate drying tube the following ingredients were mixed:
201.2 grams Isopropyl alcohol
35.1 grams of 70% aqueous solution of polydextrose Type A
2.0 grams 30% hydrogen peroxide solution The isopropanol was stirred and the peroxide added. While stirring the polydextrose solution was added beneath the surface of the isopropanol slowly (2 minutes) via a 50 cc syringe catheter tip. The mixture was stirred at room temperature (25° C.) for 24 hours. The solids were isolated and dried at 70° C. in a vacuum oven at 63.5 cm Hg for one hour. Subsequently, the semidry, white mass was broken up, dried for another hour and milled to a powder. The following data on the powder was obtained:

| | |
|---|---|
| Yield % | 89.5 |
| pH 70% solution | 2.77 |
| Color 70% solution | straw-color, clean solution |
| Composition by GPC | Concentration % |
| Polymer | 64.7 |
| Pentasaccharides | 9.0 |
| Tetrasaccharides | 9.3 |
| Trisaccharides | 10.2 |
| Disaccharides + Sorbitol | 2.6 |
| Glucose | 2.2 |
| Anhydroglucose | 1.9 |

EXAMPLE 18

The process of Example 17 wherein the 70% polydextrose Type A solution pH is raised to 5.33 and 0.14 grams of benzoyl peroxide is used to replace 2 grams of 30% hydrogen peroxide solution. The product is a purified polydextrose resembling the composition but with higher pH than that obtained in Example 17.

EXAMPLE 19

The process of Example 17 wherein the 70% polydextrose solution pH is raised to 7.03 and 0.25 grams of sodium chlorite is used in place of 2.0 grams of 30% hydrogen peroxide solution produces a purified polydextrose resembling the composition and appearance of that obtained in Example 17.

EXAMPLE 20—(METHOD 1)

An intimate mixture of 90.5 grams (40%) of methanol, 135.7 grams (60%) of polydextrose Type A and 0.136 grams sodium chlorite (0.1% based on polydextrose weight) was stirred in a 500 ml three-necked flask for 24 hours at room temperature. The solids were isolated, dried at 70° C. in a vacuum oven at 63.5 cm of Hg for 3 hours and milled to a powder. Data on the resultant product was as follows:

| | |
|---|---|
| Yield % | 89.2 |
| pH 70% aqueous solution | 2.84 |
| Color 70% aqueous solution | straw-color, clear solution |
| Composition by GPC | Concentration % |
| Polymer | 67.9 |
| Pentasaccharides | 8.3 |
| Tetrasaccharides | 8.5 |
| Trisaccharides | 8.0 |
| Disaccharides + Sorbitol | 2.8 |
| Glucose | 2.6 |
| Anhydroglucose | 1.7 |

EXAMPLE 21—(METHOD 1)

A mixture of 135.7 grams of methanol (60%), 90.5 grams polydextrose Type A (40%) and 0.091 grams of sodium chlorite (0.1% based on weight of polydextrose) was stirred in a 500 ml three-necked flask at room temperature for 24 hours. The solids were isolated, dried at 70° C. in a vacuum oven for one hour. Subsequently, the semidry mass was broken up, dried in the same oven for an additional 2 hours and milled to a fine powder. Data on the product follows:

| | |
|---|---|
| Yield % | 87.2 |
| pH of 10% aqueous solution | 2.83 |
| Color of 10% aqueous solution | water white |

| Composition by GPC | Concentration % |
|---|---|
| Polymer | 70.4 |
| Pentasaccharides | 7.9 |
| Tetrasaccharides | 7.9 |
| Trisaccharides | 6.7 |
| Disaccharides + Sorbitol | 2.9 |
| Glucose | 2.1 |
| Anhydroglucose | 1.7 |

EXAMPLE 22—(METHOD 1) A mixture of 170.57 grams (72%) methanol, 19 grams (8%) water, 47.4 grams (20%) polydextrose Type A and 0.047 grams sodium chlorite (0.2% based on the polydextrose weight) was stirred in a flask at room temperature (25° C.) for 24 hours. The solids were isolated, dried at 70° C. in a vacuum oven at 63.5 cm Hg for one hour. The resulting fluffy white mass was broken up, dried in the same oven for one additional hour and milled to a powder. Data on the product follows:

| | |
|---|---|
| Yield % | 65.8 |
| Color of a 10% water solution | water white |
| pH of a 10% water solution | 3.02 |

| Composition by GPC | Concentration % |
|---|---|
| Polymer | 77.8 |
| Pentasaccharides | 7.3 |
| Tetrasaccharides | 5.9 |
| Trisaccharides | 4.8 |
| Disaccharides + Sorbitol | 1.7 |
| Glucose | 1.4 |
| Anhydroglucose | 1.1 |

EXAMPLE 23—(METHOD 1)

In a 500 ml, three-necked flask equipped with stirrer and calcium sulfate drying tube the following ingredients were mixed:
21.2 grams polydextrose Type A (9%)
18.8 grams H₂O (8%)
196.6 grams methanol (83%)
0.021 grams sodium chlorite (0.1% based on polydextrose weight)

The methyl alcohol and sodium chlorite were stirred. Meanwhile in a separate beaker the polydextrose and water were combined and mixed until polydextrose was in solution. This was then added beneath the surface of the methanol slowly (2 minutes) via a 50 cc syringe catheter tip. The mixture was stirred at room temperature for 24 hours. The solids were isolated, dried at 70° C. in a vacuum oven for one hour. Subsequently, the semidried mass was broken up, dried in the same oven for one additional hour and milled to a fine powder.

The following data on the powder was obtained

| | |
|---|---|
| Yield % | 63.6 |
| pH of a 10% water solution | 3.07 |
| Color of a 10% water solution | water white |

| Composition by GPC | Concentration % |
|---|---|
| Polymer | 84.3 |
| Pentasaccharides | 5.9 |
| Tetrasaccharides | 4.8 |
| Trisaccharides | 3.1 |
| Disaccharides + Sorbitol | 1.1 |
| Glucose | 0.6 |
| Anhydroglucose | 0.2 |

EXAMPLE 24

A hard candy, using the products of this invention as ingredients, was prepared using the following composition and directions.

| Ingredients | Weight % |
|---|---|
| L-Aspartyl-D-alanine N—(2,2,4,4-tetramethylthietanyl) amide sweetener (CP-54,802) | 0.049 |
| Water (to dissolve sweetener) | 1.000 |
| High Purity Polydextrose pH 3.0 | 68.461 |
| Water (to dissolve polydextrose) | 30.000 |
| Citric Acid (anhydrous) | 0.340 |
| Orange Flavor N & ATP % 5615-1[1] | 0.090 |
| FD & C Yellow #6, 10% Aqueous Solution | 0.060 |
| | 100.000 |

[1]Givaudan Corp.

Procedure:

Dissolve sweetener in water and set aside. Add polydextrose to the water. While stirring heat in an oil bath set at 180° C. until polydextrose dissolves. Continue heating to 134°–135° C. Remove from heat and introduce sweetener solution, citric acid, flavor and FD & C color solution with stirring. Transfer mass to an oil coated marble slab and cool to about 80° C. Feed candy mass through a laboratory small drop roller machine which has been coated with oil. Allow to cool, and wrap in cellophane paper.

EXAMPLE 25

A cake, incorporating the products of this invention as ingredients was made using the following composition and directions.

| Ingredients | Weight % |
|---|---|
| Emulsified Shortening | 7.870 |
| Fresh Whole Eggs | 11.310 |
| Mel-O-Skim WP 34[1] | 1.210 |
| Whole Milk Solids | 0.390 |
| Purified Polydextrose pH 5.5 | 21.365 |
| CP-54,802 Sweetener | 0.014 |
| Water | 26.830 |
| Cake Flour | 27.606 |
| Sodium Bicarbonate | 0.550 |
| Glucono Delta Lactone | 0.975 |
| Vanilla Extract, Single Fold | 0.130 |
| Wheat Starch (Paygel P)[2] | 1.750 |
| | 100.000 |

[1]Dairyland Product Inc.
[2]General Mills Inc.

Procedure:

In a "Sunbeam Mix Master" bowl combine purified polydextrose, Mel-O-Skim WP34, whole milk solids, and emulsified shortening. Mix at #3 speed ~5 minutes until creamy and smooth. Add eggs and vanilla extract mix for 2 minutes. Dissolve sweetener in water add to the creamed mass, mix 2–3 minutes. Add flour, sodium bicarbonate, glucono delta lactone and wheat starch. Mix 3–5 minutes until a homogeneous creamy mix is achieved. Pour 460 grams of batter into 8×1½ inch greased cake pan. Bake at 350° F. for 30 minutes.

EXAMPLE 26

A pudding, incorporating the products of this invention as ingredients was made using the following composition and directions.

| Ingredients | Weight % |
|---|---|
| Instant Tapioca Starch | 4.80 |
| Tetrasodium Pyrophosphate | 0.18 |
| Aspartame Sweetener | 0.09 |
| Instant Corn Starch | 0.00 |
| Purified Polydextrose pH 5.5 | 14.50 |
| Artificial Vanilla Flavor #610072U[1] | 0.11 |
| Fresh Whole Milk | 80.32 |
|  | 100.00 |

[1]Polak's Frutal Works, Inc.

Procedure:

Prepare a uniform blend of dry ingredients, (tapioca starch, tetrasodium pyrophosphate, corn starch, aspartame, flavor and purified polydextrose). Pour milk into a "Sunbeam Mix Master" bowl. Add mixed dry ingredients to the milk. Mix at low speed with electric mixer, until well blended ~2 minutes. Pour into serving bowls.

EXAMPLE 27

Gum drops, (a soft candy) incorporating the products of this invention as ingredients was made using the following proportions of ingredients and according to the following directions.

| Ingredients | | Weight % |
|---|---|---|
| 7% Solution Citrus Pectin, Slow Set, 150 Grade[1] | | 31.8129 |
| Citrus Acid (anhydrous) | | 0.4900 |
| H₂O | | 19.3700 |
| Sodium Bicarbonate | | 0.1900 |
| Purified Polydextrose pH 3.0 | | 46.3200 |
| FD & C Red #40, 10% Aqueous Solution | | 0.0200 |
| CP-54,802 Sweetener | Combine and dissolve sweetener | 0.0271 |
| Water | | 1.7200 |
| Natural and Artificial Wild Cherry Flavor #3499[2] | | 0.0500 |
| | | 100.0000 |

[1]Prepare 7% pectin stock solution by introducing pectin into pre-heated water (70-80° C.) with good agitation. Bring to a boil and continue heating until pectin is completely dissolved.
[2]Warner - Jenkinson Co.

Procedure:

In a sauce pan combime purified polydextrose and water. While stirring heat in an oil bath (180° C.) until polydextrose dissolves. Add pectin solution and sodium bicarbonate, continue stirring and heating to 55-57% solids by refractometer. Introduce dissolved sweetener, citric acid, FD & C color solution and flavor with stirring. Remove from heat and cast out into pre-starched rubber mold to set. Keep at room temperature for 48 hours. Lightly dust gum drops wth starch.

EXAMPLE 28

A pie, using the products of this invention as ingredients was prepared using the following composition and directions.

| Ingredients | | Weight | Part |
|---|---|---|---|
| Sliced Peaches | | 75.115 | |
| CP-54,802 Sweetener | Combine and dissolve sweetener | 0.010 | |
| Water | | 0.625 | Pie Filling |
| Citric acid (Anhydrous) | Combine and dissolve citric acid | 0.070 | |
| Water | | 0.625 | |
| Wheat Flour | | 3.350 | |
| Ground Cinnamon Bark | | 0.090 | |
| Butter | | 1.880 | |
| Purified Polydextrose pH 3.0 | | 18.235 | |
| | | 100.000 | |
| Frozen ready to bake 9 inch pie crust[1] | | | |

[1]Winston Bros.

Procedure: Scale formulation to 800 grams.

Preheat a conventional oven to 425° C. Wash, peel, depit and slice peaches, and then immerse in an aqueous solution containing 0.05% ascorbic acid for ~5 minutes (to prevent oxidazè darkening). Subsequently, drain peaches and transfer to a bowl. Add citric acid and sweetener solution and mix and transfer to a bowl. Add citric acid and sweetener solution and mix manually with spatula. In a separate container premix wheat flour, ground cinnamon and purified polydextrose. Incorporate these premixed ingredients to the peaches with manual stirring. Place frozen ready pie crust in a 9 inch aluminum pie pan, pour pie filling into crust and dot with butter. Cover with frozen Ready Top Crust which has slits cut in it; seal and flute. Cover edge with 2-to-3 inch strips of aluminum foil to prevent excessive browning. Remove foil last 15 minutes of baking. Bake pie for 40 minutes. Remove pie from oven and let it cool on a wire rack.

EXAMPLE 29

A maple syrup incorporating the products of this invention as ingredients was made using the following preparations of ingredients and according to the following directions.

| Ingredients | Weight % |
|---|---|
| Highly Purified Polydextrose pH 6.0 | 45.000 |
| Sodium Saccharin | 0.039 |
| CP-54,802 Sweetener | 0.019 |
| Maple Extract | 0.100 |
| Caramel Color, Acid proof, 10% Aqueous Solution | 0.500 |
| Water | 54.242 |
| Sodium Benzoate | 0.100 |
| | 100.000 |

Procedure:

Dissolve sodium benzoate, CP-54,802, saccharin and highly purified polydextrose in water. Add the maple flavor and caramel color solution with good stirring

EXAMPLE 30

A frozen dessert, incorporating the product of this invention as ingredients was made using the following composition and directions.

| Ingredients | Weight % |
|---|---|
| Cream (36% butterfat) | 20.830 |
| Non-fat Dry Milk | 10.350 |

-continued

| Ingredients | Weight % |
|---|---|
| Purified Polydextrose pH 5.5 | 21.625 |
| Water | 44.990 |
| Gelatin, 120 Bloom | 0.330 |
| Avicel RC 591 | 1.000 |
| Drewmulse 700 E (emulsifier)[2] | 0.300 |
| Vanilla Extract 2-Fold | 0.500 |
| Aspartame Sweetener | 0.075 |
| | 100.000 |

[1]FMC Corporation, American Viscose Division
[2]PVO International Inc.

Procedure:

Combine all the ingredients except the vanilla extract and the aspartame. Pasteurize by rapidly heating to 165° F. and maintaining that temperature for 30 minutes. Homogenize at 2500 lbs in first stage and 500 lbs in the second stage of a laboratory Chase-Logan Corp. homogenizer. Rapidly cool to 40° F., add the aspartame and vanilla flavor and store in refrigerator overnight. Freeze the mix in an Emery Thompson ice cream freezer at 90 to 100% overrun. Transfer mix to cups, store in a freezer chest at −25° F.

EXAMPLE 31

A carbonated beverage incorporating the products of the invention as ingredients, was made using the following proportions of ingredients and according to the following directions.

| Ingredients | Weight % | Part |
|---|---|---|
| Caffeine, 1% Solution in Water | 0.700 | |
| Cola Flavor #13521040[1] | 0.090 | |
| 85% Phosphoric Acid, 50% Solution in Water | 0.040 | |
| Citric Acid, 50% Solution in Water | 0.065 | |
| Acid Proof, Caramel Color, 25% aqueous Solution | 0.370 | I |
| Lemon Extract | 0.012 | |
| Lime Extract | 0.015 | |
| Acesulfame K Sweetener[2] | 0.019 | |
| CP-54,802 Sweetener | 0.004 | |
| Purified Polydextrose pH 3.0 | 7.000 | |
| Carbonated Water, Containing 3.5 Volume Carbon Dioxide | 91.685 | II |
| | 100.000 | |

[1]International Flavors & Fragrances Inc.
[2]Farbwerke Hoechst AG

Procedure:

The ingredients of Part I are combined and mixed well until all are in solution. Add 29.934 grams of Part I to 331 grams of carbonated water (Part II).

EXAMPLE 32

A low calorie salad dressing using the products of this invention as ingredients was prepared according to the following composition and directions.

| Ingredients | Grams |
|---|---|
| Acesulfame K Sweetener | 0.067 |
| Dry Mustard | 1.200 |
| Vinegar | 36.000 |
| Tomato Sauce | 4.000 |
| High Purity Polydextrose pH 3.0 | 22.000 |
| Sodium Chloride (Salt) | 3.000 |
| Paprika Powder | 1.000 |
| Onion Powder | 1.000 |
| Garlic Powder | 1.000 |
| Black Pepper | 1.000 |
| Lemon Juice (Natural strength) | 6.000 |
| Water | 72.133 |
| Pectin, 150 Bloom | 1.600 |
| | 150.000 |

Procedure:

The dry ingredients (acesulfame K, mustard, polydextrose, salt, paprika, onion, garlic, pectin and black pepper) were blended and added to the water with constant agitation. Upon completion of this providing the lemon juice, vinegar, and tomato sauce were introduced to the mixture of dry ingredients and water with stirring. The resulting creamy mixture was furthered mixed until a homogeneous composition resulted.

EXAMPLE 33

Low calorie dry tabletop sweetener compositions using the products of this invention as ingredients, were prepared using the following proportions of ingredients and directions.

| Ingredients | Grams | Grams | Grams | Grams |
|---|---|---|---|---|
| Aspartame Sweetener | 0.67 | — | 0.30 | 0.20 |
| Sodium Saccharin | — | 0.40 | 0.33 | 0.30 |
| Acesulfame K | — | — | — | 0.15 |
| High Purified Polydextrose pH 5.5 | 99.33 | 99.60 | 99.37 | 99.35 |
| | 100.00 | 100.00 | 100.00 | 100.00 |

Procedure:

The ingredients were mixed in blender until a uniform homogeneous dry powder was obtained. One level teaspoon of these compositions were found to produce the sweetness and viscosity of one level teaspoon of sucrose.

EXAMPLE 34

A low calorie table top syrup composition using the products of this invention as ingredients, was prepared using the following composition and directions.

| Ingredients | Weight % |
|---|---|
| Highly Purified Polydextrose | 50.00 |
| Sodium Saccharin | 0.08 |
| CP-54,802 | 0.04 |
| Sodium Benzoate | 0.10 |
| Water | 49.78 |
| | 100.00 |

Method:

In a 200 ml beaker the above ingredients are mixed with a mechanical stirrer and heated to 50° C. until the sweeteners and sodium benzoate are dissolved. One level teaspoon of this composition was found to produce the viscosity and sweetness of a syrup containing 50% sucrose.

EXAMPLE 35

A low calorie gelatin dessert containing the products of this invention was prepared as follows:

| Ingredients | Weight in Grams |
| --- | --- |
| Aspartame | 0.25 |
| Purified Polydextrose pH 3.0 | 72.25 |
| Gelatin 225 Bloom | 9.00 |
| Citric Acid | 2.40 |
| Sodium Citrate | 0.40 |
| Sodium Chloride (Salt) | 0.40 |
| Spray Dried Artificial Strawberry Flavor | 0.24 |
| Strawberry FD & C Color | 0.06 |
| Water to make 16 ounces volume | |

The dry ingredients (aspartame, polydextrose, gelatin, citric acid, sodium citrate, sodium chloride, strawberry flavor, and color) were blended and dissolved in 8 ounces of boiling water. The solution was then diluted 16 ounces with cold water and refrigerated to gel.

EXAMPLE 36

A sugarless chewing gum composition containing the products of this invention was prepared as follows:

| Ingredients | Weight in Grams |
| --- | --- |
| Mannitol | 6.00 |
| Aspartame | 1.00 |
| Purified Polydextrose pH 5.5 | 83.00 |
| | 90.00 |

Procedure:
Premix above dry ingredients, mill to ~20 micron.

| Ingredient | Weight in Grams |
| --- | --- |
| Water | 24.80 |
| Dipeptide Sweetener | 0.50 |
| Purified Polydextrose pH 5.5 | 76.00 |
| Gum Base (Paloja ®)[1] | 40.00 |
| Glycerine | 1.50 |
| Cinnamon Oil | 1.20 |
| | 144.00 |

[1]L. A. Dreyfus Co.

Method:
Dissolve polydextrose in water and set aside. Grind gum base to 150-250 micron. Transfer to a stainless steel beaker and place in an oil bath (set at 80° C.) and allow to soften (~10 minutes) while stirring at 250 rpm. Add polydextrose solution and stir for ~10 minutes until a homogeneous mixture is obtained. Introduce glycerine, sweetener, and flavor by kneading is obtained. Introduce glycerine, sweetener, and flavor by kneading in the melted gum-polydextrose with some of the dusting powder (Step I). Mix until a homogeneous mixture is obtained. Disperse the remaining dusting powder on a clean table. Roll the chewing gum back and forth with a rolling pin. (Make sure that the surface of the rolled gum are dusted properly; otherwise the gum will adhere to the table). Let the rolled gum cool to 25° C., cut into rectangular pieces and package.

EXAMPLE 37

A sugarless dietetic preserve composition containing the products of this invention was prepared using the following preparation of ingredients and the following directions.

| Ingredients | | Weight % |
| --- | --- | --- |
| Purified Polydextrose pH 5.5 | | 38.130 |
| Water | | 19.380 |
| Low Methoxy Pectin | | 1.290 |
| Calcium Chloride 10% Aqueous Solution | | 0.690 |
| Strawberry Fruit | | 34.500 |
| Citric Acid 50% Aqueous Solution | | 1.120 |
| CP-54,802 | Combine and dissolve solids in water | 0.013 |
| Sodium Saccharin | | 0.030 |
| Water | | 4.847 |
| | | 100.000 |

Procedure:
In a double boiler combine polydextrose, water and pectin. Heat with stirring to the boiling point (~105° C.). Slowly and with good agitation add the calcium chloride solution. Reheat again to 105° C. Add strawberry fruit and continue heating the mix with stirring (to prevent scorching) until the temperature of 105° C. is reached. Remove from heat, add acid and artificial sweetener solution. Mix the contents well and allow the preserve to cool to 80°-90° C. Transfer to jars and allow to cool to 25° C. Tightly cap jars and store.

EXAMPLE 38

A sugarless chocolate bar composition containing the products of this invention was prepared as follows:

| Ingredients | Weight % |
| --- | --- |
| Satina 11 NT ® (hard butter)[1] | 30.00 |
| Lecithin | 0.50 |
| Dutched Cocoa Powder | 5.00 |
| Natural Cocoa Powder | 5.00 |
| Purified Polydextrose pH 5.5 | 41.47 |
| Aspartame | 0.94 |
| Vanillin | 0.04 |
| Non-Fat Dry Milk | 12.00 |
| Whole Milk Powder | 5.00 |
| Salt | 0.05 |
| | 100.00 |

[1]Durkees Industrial Food

Procedure:
Premix cocoa powders, polydextorse, aspartame, vanillin, non-fat dry milk, whole milk powder and salt. Mill in a laboratory mill to 10-20 micron and set aside. In a stainless steel beaker equipped with mechanical stirrer melt hard butter, add lecithin and dissolve. Once these are in solution, the milled mixture of dry ingredients are introduced slowly and mixed constantly while it cooks at 60° C. for 2 hours. At this point the resulting melted mass is remove from heat and is microfined in a laboratoy mill. Subsequently, the chocolate mass is transferred to a mold and left to solidify at room temperature.

EXAMPLE 39

A whipped topping composition containing the products of this invention was prepared as follows:

| Ingredients | Weight % |
| --- | --- |
| Hydrogenated Coconut Oil 96-98° F. | 15.00 |
| Sodium Caseinate | 1.25 |
| Sodium Carboxymethylcellulose (CMC) 7HOF,[1] 4% Water Solution | 5.00 |
| Vanilla Flavor 20-Fold | 0.15 |

-continued

| Ingredients | Weight % |
|---|---|
| Non-Fat Milk Solid | 1.25 |
| Artificial Sweet Cream Flavor | 0.10 |
| Drewlene 20 Emulsifier[2] | 0.75 |
| Disodium Phosphate | 0.02 |
| Sodium Saccharin | 0.07 |
| Purified Polydextrose pH 5.5 | 23.50 |
| Water 80° C. | 52.91 |
| | 100.00 |

[1]Hercules Inc.
[2]PVO International Inc.

Procedure:

Dissolve dry ingredients (sodium caseinate, polydextrose, non-fat milk solids, saccharin and disodium phosphate) in water. Add coconut oil, emulsifier, CMC solution and flavors and mix well. Pasteurize mix at 74° C. for 30 minutes. Homogenized at 1,000 psi in the first stage and 500 psi in the second stage of a laboratory Chase Logan Corp. homogenizer. Rapidly cool to 5° C. and store in refrigerator overnight. Transfer mix to a bowl of Sunbeam Mix Master and whip at high speed for 8 to 10 minutes or until stiff foam is obtained.

EXAMPLE 40

A coffee whitener containing the products of this invention as ingredients was made using the following composition and directions.

| Ingredients | Weight % |
|---|---|
| Hydrogenated Coconut Oil 92° F. | 12.000 |
| Emulsifier[1] | 0.800 |
| Carrageenan[2] | 0.015 |
| Locust Bean Gum | 0.350 |
| Vitamin A 10% Aqueous Suspension | 0.050 |
| Artificial Cream Flavor | 0.025 |
| Sodium Caseinate | 2.500 |
| FD & C Yellow #5, 0.1% Aqueous Solution | 0.020 |
| Imitation Vanilla Flavor 20-Fold | 0.020 |
| Sodium Saccharin | 0.010 |
| Sodium Phosphate (dibasic) | 0.500 |
| Calcium Phosphate | 0.200 |
| Water 80° C. | 73.000 |
| Purified Polydextrose pH 6.0 | 10.510 |
| | 100.000 |

[1]ICI Corp. Atmos ® 150
[2]Marine Colloids Inc. Viscarin 402

Procedure:

Conventional dairy processing equipment can be used to prepare the above dairy substitute. The process consists of a four step operation; mixing of ingredients, pasteurization, homogenization and cooling of mixture.

EXAMPLE 41

A sweet sauce (topping) employing the products of this invention as ingredients was made using the following composition and directions.

| Ingredients | Weight % |
|---|---|
| Purified Polydextrose pH 5.5 | 50.00 |
| Water | 37.68 |
| Potassium Sorbate | 0.10 |
| Cocoa Powder, Dutched (24-26% fat) | 12.00 |
| Vanillin | 0.06 |
| Aspartame | 0.16 |
| | 100.00 |

Procedure:

Combine polydextrose, water, potassium sorbate, cocoa powder and vanillin. While stirring heat to 90°-95° C. for 15 minutes. Add aspartame and stir 2-3 minutes to dissolve. Quickly cool to 35° C.

EXAMPLE 42

A frosting containing the products of this invention as ingredients was made using the following composition and directions.

| Ingredients for Dry Mix I | Weight % |
|---|---|
| Purified Polydextrose pH 3.0 | 51.88 |
| Sodium bicarbonate | 0.52 |
| Gelatin 300 Bloom | 1.03 |
| Egg White Solids | 3.62 |
| Emulsified Shortening (Cake Mix TM #96)[1] | 10.37 |
| Polyoxyethylene (20) Sorbitan Monostearate (Tween 60) | 1.03 |
| Amerfond TM Brand Fondant Sugar[2] | 21.78 |
| Non-fat Dry Skim Milk | 2.61 |
| Whole Milk Powder[3] | 1.03 |
| Cocoa Powder Dutched 10-12% Fat[4] | 5.25 |
| Carrageenan Stamers TM HT[5] | 0.42 |
| FD & C Chocolate Color | 0.31 |
| Enzyme Modified Whole Milk Powder (Mil-Lait (TM))[6] | 0.15 |
| | 100.00 |

| Formulation for finished frosting II | |
|---|---|
| Ingredients | Weight Grams |
| Dry Mix I | 269.00 |
| Butter | 16.70 |
| Boiling Water | 89.30 |
| | 375.00 |

[1]SCM Corporation, Durkee Foods
[2]Amstar Corp., American Sugar Division
[3]Land-O-Lakes Inc.
[4]DeZaan Inc. Cocoa Powder type D11-V
[5]Meer Corp.
[6]Beatrice Foods Co.

Procedure:

Blend sodium bicarbonate and polydektrose. Add gelatin, carrageenan and egg white solids, mix thoroughly. Add shortening and Tween 60, mix well. Add remaining dry ingredients (fondant sugar, skim milk, whole milk, cocoa, color and Mil-Lait). Uniformly blend to a homogeneous mix and mill to fine powder. Beat 269 grams of the resulting dry mix, 16.70 grams butter and 89.30 grams boiling water in small mixing bowl of the Sunbeam Mix Master at low speed, scraping bowl constantly for about one minute. Beat on high speed, scraping bowl occassionally for 5-6 minutes.

EXAMPLE 43

A marshmallow incorporating the products of this invention as ingredients was prepared using the following proportions of ingredients and according to the following directions.

| Ingredients | Weight % |
|---|---|
| Gelatin 225 Bloom | 2.33 |
| Water | 14.71 |
| Sucrose | 20.50 |
| Corn Syrup, 42 DE H1435[1] | 10.51 |
| Purified Polydextrose pH 3.0, 70% Aqueous Solution | 48.32 |
| Sodium Bicarbonate | 0.20 |
| Imitation Vanilla-Marshmallow Flavor #610076U[2] | 0.08 |
| Dusting Starch[3] | 3.35 |

| Ingredients | Weight % |
|---|---|
| | 100.00 |

[1] CPC International, Inc.
[2] Polak's Frutal Works, Inc.
[3] A. E. Staley Manufacturing Co.

Procedure:

Combine gelatin and water. Allow to stand at room temperature for at least 30 minutes before using. Combine sucrose, corn syrup and polydextrose solution. While stirring heat to 117° C. Cool to 100° C. Add soaked gelatin and sodium bicarbonate and flavor. Mix to dissolve gelatin. Cool to 71° C. Transfer mixture to a mixing bowl. Beat at high speed until a specific gravity of 0.45 to 0.47 in whipped mix is obtained. Spread whipped mix on a brown paper lined slab. Allow to set for 12-24 hours—(at this point moisture content of marshmallow ranges from 13-15%). Lightly moisten brown paper. After a few seconds peel paper off the marshmallow. Allow wet surface of marshmallow to dry for ~one hour. Cut marshmallow into desired size. Lightly dust with dusting starch.

EXAMPLE 44

Sugarless, low calorie caramels (soft candy) containing the products of this invention as ingredients were prepared using the following proportions of ingredients and according to the following directions:

| Ingredients | Weight % |
|---|---|
| Purified polydextrose pH 6.0, 70% aqueous solution | 60.04 |
| All-purpose medium cream | 25.04 |
| Glycercol monostearate (Drewmulse 200K)[1] | 1.00 |
| Kappa carrageenan HWG[2] | 0.06 |
| Evaporated milk | 12.23 |
| Vanilla | 0.05 |
| Chocolate powder flavor with added color #13549106[3] | 1.00 |
| Aspartame | 0.18 |
| Water | 0.40 |
| | 100.00 |

[1] PVO International, Inc.
[2] Marine Colloid, Inc.
[3] International Flavor and Fragrances, Inc.

Procedure:

Combine polydextrose, cream, glycerol monostearate, carageenan and chocolate flavor. While stirring, heat until mixture comes to a full boil. Add evaporated milk and continue stirring and heating the mixture to 115° C. Add vanillin. Stir well. Combine aspartame with water (0.4 grams) and mix until wet and tacky. Add to the batch with good stirring. Transfer mass onto a lightly oiled slab. Allow to cool to ~25° C. Cut into desire size and wrap.

EXAMPLE 45,

An oil free blue cheese salad dressing incorporating the products of this invention as ingredients was prepared using the following composition and directions:

| Ingredients | Weight % |
|---|---|
| Purified polydextrose pH 5.5 | 21.00 |
| Water (to dissolve polydextrose) | 9.00 |
| Water | 41.05 |
| Sodium benzoate | 0.10 |
| Xanthan gum-Keltrol F[1] | 0.10 |
| Modified corn starch-Redisol #88[2] | 3.50 |
| Modified waxy maize starch #721 AE[3] | 1.00 |
| Natural blue cheese (grated) | 10.00 |
| Worcestershire sauce | 0.50 |
| Monosodium glutamate | 1.00 |
| Garlic powder | 0.40 |
| Onion powder | 0.40 |
| Celery salt | 0.10 |
| Salt (NaCl) | 2.65 |
| Vinegar | 9.00 |
| Titanium dioxide | 0.20 |
| | 100.00 |

[1] Kelco Co.
[2] Staley Mfg. Co.
[3] American Maize Product Co.

Procedure:

Dissolve polydextrose in water using good mechanical agitation. Dissolve sodium benzoate in water. Add the xanthan gum and mix to dissolve. And modified corn and waxy maize starches. Mix until completely hydrated. Combine hydrated hydrocolloids and polydextrose solution. Add remaining ingredients (i.e. grated cheese, worcestershire sauce, monosodium glutamate, garlic powder, onion powder, celery salt, salt, vinegar and titanium dioxide). Mix until creamy and smooth. Homogenize at 1,000 psi or pass through a colloid mill.

EXAMPLE 46

An imitation mayonnaise using the products of this invention as ingredients was prepared using the following proportions of ingredients and procedure.

| Ingredients | Percent | Part |
|---|---|---|
| Egg white solids | 3.04 | |
| Water | 18.22 | |
| Rapid set pectin, 150 grade | 1.01 | |
| Gelatin 225 bloom | 0.51 | |
| Modified wheat starch[1] | 0.81 | |
| Modified waxy maize starch[2] | 0.81 | I |
| Purified polydextrose pH 5.5, 70% aqueous solution | 38.23 | Starch paste |
| White vinegar, 50 grain | 5.60 | |
| White pepper, powder | 0.05 | |
| Ground mustard | 0.66 | |
| Garlic powder | 0.01 | |
| Sodium benzoate | 0.10 | |
| Salt (NaCl) | 0.86 | |
| Egg yolk | 3.03 | |
| Dehydrated lemon juice[3] | 0.10 | |
| Methional 0.1% in ethyl alcohol[4] | 0.05 | |
| Corn oil | 24.18 | II |
| Egg yolk | 2.53 | Salad dressing |
| Titanium dioxide | 0.20 | |
| | 100.00 | |

[1] Paygel ® Wheat Starch - General Mills Corp.
[2] Polar Gel Amaizo Starch - American Maize Products Company
[3] Dehydrated Lemon Juice - Plant Industries Inc.
[4] Methional-Flavor Ingredient Procedure:
I. Starch Paste
1. With a mechanical stirrer, dissolve egg white solids in half their volume of water.

2. Hydrate pectin in half the remaining amount of water (or one-quarter of the total amount of water indicated in Part I) by heating to 80°–90° C. in a mixing kettle.

3. Heat remaining one-quarter of water to 90° C. and dissolve gelatin.

4. Dissolve in polydextrose solution using mechanical agitation. Add pectin solution, vinegar, spices, sodium benzoate, salt, egg yolks, lemon, and methional (that is, the remaining ingredients of Part I); mix well.

5. Combine solutions of egg white and gelatin; beat at medium speed. Add to the other mixed ingredients. Mix using good agitation.

6. Transfer the resulting slurry to a mixing kettle and, while stirring, heat to 94°–96° C.

7. Cool to 40° C. Homogenize at 1,000 psi or pass through a colloid mill.

II. Salad Dressing

8. Mix starch paste (Part I) with the egg yolk using good stirring. Slowly add oil, pausing during its addition to allow oil to mix well. Add titanium dioxide; mix well.

9. Emulsify through homogenizer at 1,000 psi or through a colloid mill.

EXAMPLE 47

Low calorie sugarless cookie incorporating the products of this invention was made using the following composition and according to the following directions.

| Ingredient | Weight % |
| --- | --- |
| Purified polydextrose pH 3.0 | 37.500 |
| Dutched cocoa powder 10–12% fat | 1.750 |
| Butter | 5.060 |
| Corn oil | 4.050 |
| Whole fresh eggs | 11.250 |
| Vanilla extract, single fold | 0.450 |
| Water | 5.435 |
| Sodium bicarbonate | 0.450 |
| All purpose flour | 33.800 |
| Sodium saccharin | 0.135 |
| FD & C Chocolate color | 0.120 |
| | 100.000 |

Procedure:

Dissolve saccharin and chocolate color in water—set aside. In a "Sunbeam Mix Master" combine polydextrose, cocoa powder, butter and corn oil. Mix at medium speed for ~5 minutes. Scrape side of bowl add eggs and vanilla extract. Mix 2–3 minutes or until a smooth creamy mix is obtained. Add water with dissolved sweetener and color. Mix ~2 minutes. Add flour and sodium bicarbonate. Mix until a homogeneous creamy mixture is achieved (~3 minutes). Place dough in a cookie gun and drop on lightly greated pan. Bake at 350° F. for 8–10 minutes.

EXAMPLE 48

A low calorie pre-sweetened dry beverage mix using the products of this invention was made using the following composition and method of preparation.

| Ingredients | Weight % |
| --- | --- |
| Purified polydextrose pH 3.0 | 426.20 |
| Aspartame | 3.60 |
| Citric Acid, anhydrous | 23.45 |
| Sodium citrate | 3.75 |
| Spray Dry Strawberry flavor F8595[1] | 42.60 |
| Strawberry FD & C color | 0.40 |
| | 500.00 |

[1]Givaudan Corp.

Procedure:

Combine ingredients in a commercial type (Model No. 91-215) Waring Blender and blend until a homogeneous powder is obtained. To make a drink: Dissolve 11.73 grams of the dry beverage mix in 4 ounces of cold water.

EXAMPLE 49

Preparation of Polydextrose/Aspartame Tabletop Sweetener Experimental Procedure

A. Neutralization, Bleaching and Purification of Polydextrose (METHOD 2)

A 500 ml three-necked flask equipped with a mechanical stirrer and condenser was charged with 35.1 grams polydextrose Type A 70% solution (w/w) in deionized water (24.6 grams solids) and 0.29 grams of a 30% (w/w) hydrogen peroxide aqueous solution. The contents were thoroughly mixed. While heating in an oil bath to 70° C., stirring was continued and pH of solution was brought to pH 9 with a 45% (w/w) aqueous solution of potassium hydroxide. The temperature, pH and stirring of solution was maintained constant for approximately three hours until a water white solution was obtained (Total amount of 45% KOH solution required was 0.59 grams). The colorless solution was then adjusted to pH 6.1 with a 20% (w/w) solution of anhydrous citric acid in $H_2O$ (0.26 grams) and subsequently cooled to 55° C.

The solution was stirred at medium speed and 175 grams of ethanol added. The resulting mixture was stirred at 55° C. for 90 minutes, cooled to 25° C. and vacuum filtered. The solids were washed with 50 ml of ethanol to yield 25.3 grams of white wet powder which contained 7.6% volatiles (i.e., water and solvent).

B. Preparation of Tabletop Sweetener

To a 50 ml beaker containing 11.9 grams of the above wet cake (11.0 grams dry solids) was added 4.585 grams of a suspension composed of 98.15% water and 1.85% aspartame (w/w). The ingredients were thoroughly blended to obtain a homogeneous mixture of a syrupy consistency. This was then transferred into a 6"×10" pyrex glass tray and dried at 65° C. in a vacuum oven at 75 mm Hg pressure for 1.5 hours. The resulting opaque glass-like solid was milled to 420-840 micron.

The yield was 10.3 grams (93%) of a white crystalline sucrose-like tabletop sweetener.

Assays indicated less than 1 ppm of residual $H_2O_2$, ~0.3% ethanol and ~4% $H_2O$. A 10% (w/w) aqueous solution had a pH of 6.0 and was found to have color, sweetness intensity, quality and a syrupy mouthfeel equivalent to sucrose.

EXAMPLE 50

Preparation of Polydextrose/CP-54,802 Tabletop Sweetener Experimental Procedure

A. Neutralization, Bleaching and Purification of Polydextrose—(METHOD 2)

A 500 ml three-necked flask equipped with mechanical stirrer and condenser was charged with 158 grams of a 70% (w/w) polydextrose aqueous solution (110.6 grams solids), and 1.29 grams of 30% (w/w) hydrogen peroxide in water. The solution was mixed thoroughly, adjusted to pH 9 with a 45% (w/w) aqueous KOH solution, and heated to 85° C. in an oil bath. Temperature, pH and stirring of solution was maintained constant for 2.5 hours, until a water white color was achieved. (Total amount of KOH solution used was 2.31 grams). Subsequently, the colorless solution was adjusted to pH 6 with 20% (w/w) citric acid solution in $H_2O$ (1.18 grams) and cooled to 77° C.

A second 500 ml three-necked flask equipped with mechanical stirrer and condenser was charged with 201 grams of methanol. While stirring vigorously, 35.1 grams (24.6 grams solid) of the above decolorized and partially neutralized polydextrose solution was added beneath the surface of the methanol slowly (~5 minutes) via a 60cc syringe catheter tip. The mixture was stirred at ambient temperature (~25° C.) for one hour. The solids were filtered off and washed with 100 grams of methanol by stirring at room temperature for 30 minutes. The yield was 29.1 grams of a white wet powder. A sample dried overnight in a vacuum oven at 55° C. indicated a weight loss of 30.6%.

B. Preparation of Tabletop Sweetener

In a 50 ml beaker, 20.2 grams of the wet cake described in A (above) (14 grams dry solids) was combined with 5.0035 grams of a 0.07% (w/w) aqueous solution of CP-54,802. The mixture was thoroughly blended to achieve a homogeneous product having a white syrupy appearance. The mixture was transferred into a 6"×10" pyrex glass tray and dried in a vacuum oven at 70° C. at a pressure of 75 mm Hg for 1.75 hours. The resulting opaque glassy material was milled to 420-840 micron. The yield was 13.9 grams (99.3%) of white solids. The product exhibited a refined sucrose-like appearance, texture and sweetness properties.

EXAMPLE 51

Preparation of Polydextrose/CP-54,802/Acesulfame Tabletop Sweetener

A. Neutralization, Bleaching and Purification of Polydextrose—(METHOD 2)

To a 250 ml three-necked flask equipped with a mechanical stirrer and condenser was added 41 grams of a 60% (w/w) aqueous solution of polydextrose (25 grams solids) and 0.29 grams of a 30% (w/w) aqueous solution of hydrogen peroxide. The solution was stirred and heated to 85° C., adjusted to pH 9 with a 45% (w/w) aqueous solution of KOH. These conditions were maintained constant for ~2.5 hours and subsequently cooled to 77° C. and then pH was adjusted to pH 6 with a 20% citric acid solution. With vigorous stirring, 75 grams of ethyl acetate was added and the mixture refluxed at 77° C. for one hour. The resulting slurry was cooled to 25° C. and the liquid layer decanted. The solids were washed with 75 grams of ethyl acetate at 77° C. After separation, the wet cake weighed 35.3 grams. A dried sample indicated a weight loss of 32.6%.

B. Preparation of Tabletop Sweetener

In a 50 ml beaker, 15 grams of the wet cake of A (above) (14 grams dry solids) was thoroughly mixed with 1.4 grams of a 4% water solution containing 96:4 acesulfame- to-CP-54,802 ratio by weight. To this was added 2 grams of water, and blended well to obtain a product with a white opaque syrupy appearance. The mixture was transferred into a 6"×10" pyrex glass tray, dried in a vacuum oven for one hour at 70° C. at 75 mm Hg pressure. The opaque glassy mass was ground, dried for an additional 45 minutes at 70° C. at 25mm Hg pressure and milled to 420-840 micron.

The yield was 13.8 grams (98.6%). The products exhibited the color, crystalline appearance, approximate bulk density, sweetness quality and intensity of refined sucrose.

I claim:

1. A method for reducing the color, glucose content and anhydroglucose content of polydextrose Type A which comprises the steps of (1) contacting a 60-70% (W/W) aqueous solution of polydextrose Type A with a food approved bleaching agent at a temperature of 25°-90° C. and a pH of about 2.5 to about 9; (2) adjusting the pH of the product of step (1), if above 7, to about 6; (3) adding one or more of the solvents selected from the group consisting of methanol, ethanol and ethyl acetate such that said solvent comprises 50-80% (W/W) of the mixture; (4) filtering the final product, and if desired, drying.

2. The method of claim 1, wherein the food approved bleaching agent is selected from the group consisting of hydrogen peroxide, benzoyl peroxide and sodium chlorite, a pH of about 9 and adjusting the pH to about 6 with a 20% (w/w) aqueous citric acid solution.

3. The method of claim 2, wherein the solvent is ethanol and the food approved bleaching agent is hydrogen peroxide.

4. A method for preparing a tabletop sweetener which comprises the steps of (1) blending a 70-93% (W/W) water wet cake of polydextrose prepared according to the method of claim 1, with a 0.05-5% (W/W) aqueous suspension or solution of an artificial sweetener in a ratio corresponding to the isosweetness of sucrose; (2) heating the homogeneous solution or syrup to dryness at 50°-90° C. under vacuum, and (3) milling the resulting solid to a size of about 420-840 microns.

5. The method of claim 4, wherein the artificial sweetener is one or more selected from the group consisting of L-aspartyl-L-phenylalanine methyl ester, 3-(L-aspartyl-D-alanamido)-2,2,4,4-tetramethylthietane, saccharin and base salts thereof, potassium 6-methyl-1,2,3-oxathiazin-4(3H)-one-2,2-dioxide and cyclamate and base salts thereof.

* * * * *